March 2, 1926. 1,575,565
E. C. FREEMAN
TRANSMISSION CLUTCH CONTROL
Filed Sept. 2, 1925 2 Sheets-Sheet 1

INVENTOR
ERNEST C. FREEMAN
BY
Philip S. Hopkins
ATTORNEY

March 2, 1926.
E. C. FREEMAN
TRANSMISSION CLUTCH CONTROL
Filed Sept. 2, 1925
1,575,565
2 Sheets-Sheet 2
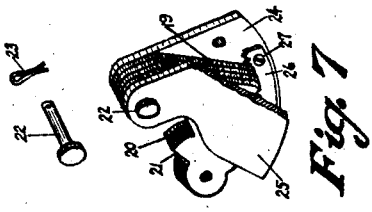
INVENTOR
ERNEST C. FREEMAN
BY
*Philip S. Hopkins*
ATTORNEY Patented Mar. 2, 1926.

1,575,565

UNITED STATES PATENT OFFICE.

ERNEST C. FREEMAN, OF ENDICOTT, NEW YORK.

TRANSMISSION-CLUTCH CONTROL.

Application filed September 2, 1925. Serial No. 54,071.

*To all whom it may concern:*

Be it known that I, ERNEST C. FREEMAN, a citizen of the United States, residing in Endicott, New York, have invented certain new and useful Improvements in a Transmission-Clutch Control, of which the following is a description, reference being had to the accompanying drawings, forming a part of this specification.

My invention relates to transmission clutch control and has for its primary object the provision of means for automatically disengaging the transmission clutch on an automobile and shifting it to "neutral" position when the brake pedal is operated.

Another object is to provide means for locking the clutch control in "neutral" position upon the application of the brake.

Another object is to provide the clutch pedal with means for unlocking said control to render the transmission mechanism again operative with respect to the transmission gears and driving shaft.

A still further object is to provide means for disengaging the transmission clutch and locking it in its disengaged position upon the application of either the foot brake or the emergency brake.

Still another object contemplates a clutch control device whereby the clutch may be operated in the usual manner without interference from the above mentioned locking arrangement connected to the brakes.

More specifically my invention relates to an attachment secured to the brake pedal of an automobile and having connection with the clutch mechanism thereof, whereby upon application of either the foot pedal brake or the emergency lever brake, said clutch will be placed in "neutral" position and locked in such position until such time as the operator desires to reengage the clutch or "throw the car in gear", which he may do by simply operating the clutch pedal in the usual manner.

The advantages of this invention will be apparent from the foregoing. It is particularly useful on automobiles in which new operators or beginners are learning to drive. With this attachment, the operator need not worry about the confusing arrangement and simultaneous operation of clutch and brake levers or pedals, but simply needs to remember in case of an emergency to put on the brake, which will bring the car to a stop and automatically at the same time throw the clutch mechanism in "neutral" position and thereby avoid what is normally known as "killing the engine".

My invention also eliminates the necessity of putting on the emergency brake, in some types of cars, when it is desired to leave the car standing with the engine still running.

I have shown and described my invention as applied to the transmission mechanism of a Ford automobile, as my invention is more especially adaptable to that type. I do not limit myself, however, to this particular application, for it will be understood that my invention is applicable to other types of transmission mechanisms as well.

Referring now to the drawings, wherein like reference numerals indicate like parts:

Figure 2 is a side view of the attachment, the parts being shown in their normal position representing that of "high gear".

Figure 3 is a view similar to Figure 2 showing the parts in the position occupied when the transmission mechanism is locked in "neutral" position.

Figure 4 is a top plan view of the attachment.

Figure 5 is a detail perspective of the shifter arm.

Figure 6 is a detail of the locking pawl.

Figure 7 is a detail of another element of the shifting mechanism.

Figure 1:
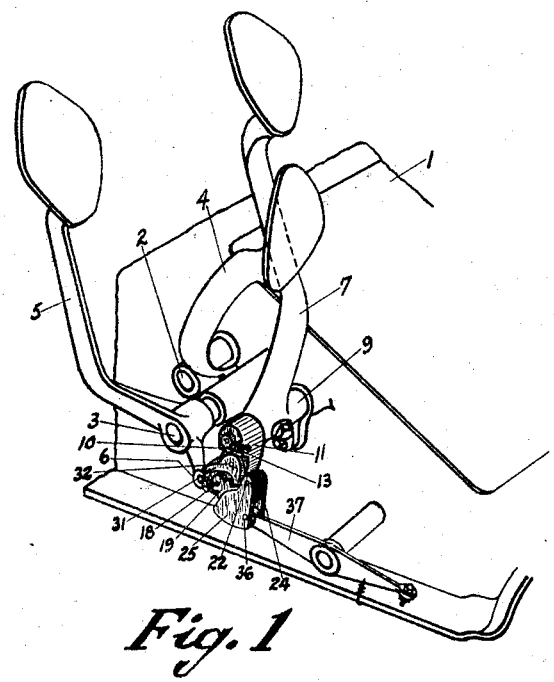
Figure 1 is a perspective view of part of a Ford transmission mechanism showing the application of my invention thereto.

The reference numeral 1 indicates the gear or transmission box of a Ford automobile to which my invention is applied. Shafts 2, and 3 extend through one side of the casing 1 and support respectively the "reverse" pedal 4 and the clutch pedal 5. It will be noted with reference to Figure 1 that the clutch pedal 5 is provided with an extension 6 at its lower end for a purpose to be described.

The brake pedal 7 is mounted upon its shaft 8 (see Figures 2 and 3) projecting through the side of the housing 1. This brake pedal shaft 8 extends beyond the hub 9 of the brake pedal and is provided at its end with a rigid lug 10 adapted for rotation with the shaft as the brake pedal is operated. Pivoted on the brake shaft 8 between the hub 9 and the lug 10, is one end of a shifter arm 11. It will be noted particularly with reference to Figure 5, that the upper or pivoted end of the shifter arm 11 is considerably thicker than the body portion 12 thereof, and such thickened portion is provided at one edge with an upstanding boss through which is screw threaded an adjusting screw 14 locked in position by the lock nut 15. The inner end of the adjusting screw 14 projects beyond the boss 13 for engagement with the lug 10 when the brake pedal is rocked forward. The opposite or free end 16 of the shifter arm 11 is provided with an upstanding boss or lug 17 for a purpose to be described.

Pivoted to the lower end 16 of the shifter arm 11, as at 18 is a connector link 19 provided on its upper edge with a "high gear" recess or notch 20 and adjacent thereto, a "neutral" shoulder 21. This connector link 19 is preferably formed as a laminated unit of several plates preferably four in number secured together and all identical in size and shape. This construction lends itself to simple and cheap manufacture, inasmuch as these plates can be stamped out of comparatively thin metal and superposed one upon the other to make up the unit or link. If desired, however, this connector link 19 may be a solid piece drop forged or otherwise formed.

Secured at one end of the link 19, as by means of the bolt 22, and cotter pin 23 are two adjustment plates 24 and 25, one on either side of the connector link 19. These plates 24 and 25 are provided on their inner sides adjacent the lower edges thereof with toothed racks 26 secured to the plates as by screws or rivets 27. The teeth of the racks 26 are adapted to engage and lock with teeth 28 cut in the lower edge of the connector link 19. The construction just described forms an adjustment device which will be explained later.

The shifter arm 11 is provided intermediate its end with an upstanding circular boss 29 through which is provided a pivot opening 30. A locking pawl 31 is provided intermediate its end with a pivot pin 32 for engagement within the opening 30 whereby said locking pawl 31 is pivotally mounted upon the shifter arm 11 and spaced slightly therefrom by means of the boss 29. A spring 33 has one end anchored in the boss 29 and is coiled about said boss and has its free end extending outwardly and engaging the underside of the lock pawl adjacent the free end 34 thereof. (See Figures 2 and 3.) The tendency of this spring is to normally rock the locking pawl on its pivot upwardly to the position shown in Figure 3. The opposite end 35 of the locking pawl being normally forced downwardly, has engagement with either the "high gear" notch 20 or the "neutral" shoulder 21 of the connector link 19, depending upon the position of the shifter arm 11.

The plates 24 and 25 have pivotal connection as at 36 with the inner end of a rocker arm 37 pivoted centrally as at 38 and provided at its outer end with an adjustable set screw 39. The rocker arm 37 forms part of the usual Ford transmission mechanism, the pivot or shaft 38 thereof having operative connection with the clutch element within the housing 1 whereby said element is brought into or out of engaging position with relation to the driving shaft. The operation and construction of this rocker arm 37 and its attendant parts are common and well known in the art and need not be further described, it being understood that springs are employed within the housing 1 both on the brake pedal shaft 8 and in connection with the rocker arm shaft 38 to normally force the outer end of the rocker arm 37 downwardly to the position shown in Figure 2. If desired, additional tension by means of spring 40 may be employed to act directly on the outer end of the arm 37 to normally force it downwardly. It will also be understood without disclosure and detailed description that the usual emergency brake lever (not shown) is provided with means for engaging the set screw 39 on the outer end of the rocker arm 37 whereby upon the pulling back or setting of such emergency brake lever, such means through engagement with the set screw 39 will tend to rock the arm 37 against the tension of the aforementioned springs to the position shown in Figure 3. This operation, as is well known, tends to place the clutch mechanism in "neutral" position.

It will be noted with reference to Figure 6 that the locking pawl 31 is cut away on either side of its upper edge as at 41 to reduce the weight thereof, a reinforcing wing however being left at 42 centrally of the upper edge to lend strength to the pawl.

The end 34 of the locking pawl is extended laterally as at 42$^a$ overlapping the upper edge of the shifter arm 11, to receive the lower end of the extension 6 carried by the clutch pedal 5, whereby said locking pawl may under certain circumstances be rocked on its pivot. As is well known, the clutch pedal 5 when depressed is adapted to also move laterally slightly in the direction of the housing 1, hence the widened portion 42 of the locking pawl 31 to permit such inward lateral movement of the extension 6 of the clutch lever without the latter slipping off of the pawl 31 when in engagement therewith.

The operation of the invention is as follows: Assuming that the automobile is moving along normally in "high gear" with the parts in the position shown in Figure 2, it will be noted that in such position the end 35 of the locking pawl 31 is engaged within the "high gear" recess 20 of the link 19 and being in such position said link is in its uppermost position as is also the inner end of the rocker arm 37, said parts being normally held in such position by means of the usual spring mechanism (not shown) within the housing 1, it being understood that in such position of the rocker arm 37, the clutch mechanism within the housing is in its engaged position or in operative connection with the transmission gears and driving shaft.

It now being desired to bring the car to a stop, or slow it down, it is merely necessary for the operator to depress the brake pedal 7 which accomplishes the following results: Upon rocking the brake pedal forward, the shaft 8 is rotated, carrying with it the lug 10 which, engaging with the set screw 14, rigid with the shifter arm 11, rocks said shifter arm on its pivot. It should be stated here that the adjustment screw 14 is provided in order that the operation of the clutch shifting mechanism may be timed or adjusted to the exact instant when the braking operation begins to take place upon the depression of the brake pedal.

As will be apparent from Figures 2 and 3, as the shifter arm 11 is rocked to the right as above described, the connector link 19 will also be carried to the right and because of its pivotal connection 36 with the rocker arm 37, will also be forced downwardly. During such downward movement of the connecting link 19, the end 35 of the locking pawl will ride out of the "high gear" notch 20 and the instant that it is free of said notch will, due to the action of the spring 33, snap over into engagement with the "neutral" shoulder 21 of the connector link where it will remain and thus lock the parts in "neutral" position or that shown in Figure 3.

As the connector link 19 is forced downwardly as just explained, it of course carries with it the plates 24 and 25 which are rigid therewith because of the toothed engagement, and said plates in turn rock the inner end of the rocker arm 37 downwardly against the tension of the springs acting thereon, thus rocking the shaft 38 which as before explained operates to disengage the clutch and place it in "neutral" position. It may be said here that the pulling back or setting of the emergency brake lever has the same effect on the parts just explained as does the depressing of the foot brake pedal. In other words, the forcing upwardly of the outer end 39 of the rocker arm 37 tends to pull the plates 24 and 25, and the connector link 19 downwardly which permits the locking pawl to escape from the "high gear" notch 20 and on to the "neutral" shoulder 21. The toothed adjustment 28 between the plates 24 and 25 and the connector link 19 is provided in order that when assembling the device the proper connection may be had between the rocker arm 37 and the shifter mechanism.

It will be seen, therefore, that the operator upon depressing the foot brake pedal or setting the emergency brake, not only applies the brake to stop the car but simultaneously and automatically disengages the clutch and locks it in "neutral" position. If it is now desired to reengage the clutch and again establish the driving connection, it is only necessary to slightly depress the clutch pedal 5 whereupon the lower extension 6 thereof engages with the end 34 of the locking pawl, rocking said pawl on its pivot until the end 35 of said pawl disengages the "neutral" shoulder 21 on the connector link 19 whereupon the spring mechanism acting upon the rocker arm 37 and shaft 8 will immediately return the shifter arm 11 and the connector link 19 to their normal positions, the end 35 of the locking pawl resuming its place within the "high gear" notch 20. If the car has been brought to a complete stop and it is desired or necessary to first go into "low gear", the clutch pedal 5 is further depressed in the usual manner with the result that the lower extension 6 thereof not only rocks the end 34 of the locking pawl on its pivot, but forces such end 34 into engagement with the boss 17 carried on the lower end of shifter arm 11, this resulting in shifting the shifter arm 11 still further to the right in Figure 3 independent of the shaft 8, and consequently in rocking the rocker arm 37 still further downward than shown in Figure 3, thereby rotating the shaft 38, which in turn operates to place the clutch mechanism in "low gear" within the housing 1. When enough momentum to the car has been acquired in "low gear", the operator returns the clutch pedal 5 to its normal position thereby releasing the parts just described whereupon they automatically assume the position shown in Figure 2 or "high gear" in the manner before explained. It will be seen, therefore, that the shifting of the transmission mechanism from "low gear" to "high gear" or vice versa may be accomplished in the usual manner without in any way being affected by my atachment.

Although I have described my invention as applied to the clutch transmission mechanism of a Ford automobile, it will be understood that with slight modifications, the same could be readily adapted to other types of transmissions without departing from the scope and principle of the invention. Obviously too, my invention is susceptible to various changes in details of construction and operation without departing from the scope thereof, and I do not limit myself to the exact form shown and described other than by the appended claims.

I claim:—

1. In combination with the clutch and brake of an automobile transmission and shafts therefor, pedals rigid on said shafts, means operated by said brake shaft for disengaging said clutch and locking it in such disengaged position, and means operated by said clutch pedal for releasing said locking means.

2. In combination with the clutch and brake of an automobile transmission and shafts and pedals therefor, said clutch pedal being free at both ends, means operated by said brake for disengaging said clutch and locking it in such disengaged position, and means operated by the lower free end of said clutch pedal only for releasing said locking means.

3. In combination with the clutch and brake of an automobile transmission, a shifter arm adjustably pivoted to said brake and having connection with said clutch, whereby said clutch is disengaged upon operation of said brake, means carried by said arm for automatically locking said clutch in such disengaged position, and means carried by said clutch for releasing said locking means.

4. In combination with the clutch and brake of an automobile transmission, a shifter arm adjustably pivoted to said brake and having adjustable connection with said clutch, whereby said clutch is automatically disengaged upon operation of said brake, and a pivoted locking pawl carried by said arm for automatically locking said clutch in such disengaged position.

5. In combination with the clutch and brake of an automobile transmission, a shifter arm adjustably pivoted to said brake and having adjustable connection with said clutch, whereby said clutch is automatically disengaged upon operation of said brake, a pivoted locking pawl carried by said arm for automatically locking said clutch in such disengaged position, and means carried by said clutch for releasing said locking pawl.

6. In combination with the clutch and brake of an automobile transmission, a shifter arm operatively connected to said brake, a connector link pivoted to said arm and to said clutch, whereby operation of said brake disengages said clutch, and locking means automatically engageable with said link for locking said clutch in such disengaged position.

7. In combination with the clutch and brake of an automobile transmission, a shifter arm operatively connected to said brake, a connector link pivoted to said arm and to said clutch whereby operation of said brake disengages said clutch, and a locking pawl pivoted to said arm and having engagement with said link for locking said clutch in such disengaged position.

8. In combination with the clutch and brake for an automobile transmission, a shifter arm adjustably connected to said brake, a connector link pivoted to said arm and to said clutch whereby operation of said brake disengages said clutch, a locking pawl pivoted to said arm and engaging with said link for locking said clutch in such disengaged position, and means carried by the clutch pedal for rocking said pawl on its pivot and releasing said lock.

9. In combination with the clutch and brake for an automobile transmission, a shifter arm adjustably connected to said brake, a connector link pivoted to said arm and having adjustable connection with said clutch whereby operation of the brake disengages said clutch, a shoulder on said link, and a locking pawl pivoted to said arm and provided with means for normally forcing said pawl into engagement with said shoulder upon the operation of said brake whereby said clutch is automatically locked in such disengaged position.

10. In combination with the clutch and brake of an automobile transmission, a shifter arm adjustably connected to said brake, a connector link pivoted to said arm and having adjustable connection with said clutch whereby operation of the brake disengages said clutch, a shoulder on said link, a locking pawl pivoted to said arm and provided with means for normally forcing said pawl into engagement with said shoulder upon the operation of said brake whereby said clutch is automatically locked in such disengaging position, and means carried by the clutch pedal for releasing said locking pawl.

11. In combination with the clutch and brake of an automobile transmission, means connecting the brake with the clutch mechanism whereby to disengage the clutch when the brake is operated, said means comprising a shifter arm and a connector link pivoted thereon, teeth on said connector link and toothed plates adjustably secured thereto and pivoted to said clutch mechanism.

12. In combination with the clutch and brake of an automobile transmission, means connecting the brake with the clutch mechanism whereby to disengage the clutch when the brake is operated, said means including a shifter arm connected to said brake and a laminated connector link pivoted to said arm and having teeth, toothed adjusting plates secured to said link and having pivoted connection to said clutch mechanism.

13. In combination with the clutch and brake of an automobile transmission, means connecting the brake with the clutch mechanism whereby to disengage the clutch when the brake is operated, said means including a shifter arm connected to said brake and a laminated connector link pivoted to said arm and having teeth, toothed adjusting plates secured to said link and having pivoted connection to said clutch mechanism, and means on said arm and engaging said link for automatically locking said clutch in such disengaged position.

14. In combination with the clutch and brake of an automobile transmission, means connecting the brake with the clutch mechanism whereby to disengage the clutch when the brake is operated, said means including a shifter arm connected to said brake and a laminated connector link pivoted to said arm and having teeth, toothed adjusting plates secured to said link and having pivoted connection to said clutch mechanism, and means on said arm and engaging said link for automatically locking said clutch in such disengaged position, and means carried by the clutch pedal for releasing said locking means.

15. In combination with the clutch and brake of an automobile transmission, means connecting the brake with the clutch mechanism whereby to disengage the clutch when the brake is operated, a locking pawl engaging said means for automatically locking said clutch in such disengaged position, said pawl being provided at its free end with a widened portion, an extension carried by the clutch pedal and engageable with said widened pawl whereby operation of said clutch pedal releases said locking means.

ERNEST C. FREEMAN.